United States Patent [19]

Harada et al.

[11] Patent Number: 5,552,166

[45] Date of Patent: Sep. 3, 1996

[54] COATED FRIED FOOD PRODUCT

[75] Inventors: Seiki Harada, Kanagawa-ken; Masayuki Ikeda, Saitama-ken, both of Japan

[73] Assignee: Uni Colloid Kabushiki Kaisha, Zushi, Japan

[21] Appl. No.: 463,104

[22] Filed: Jun. 5, 1995

Related U.S. Application Data

[63] Continuation of Ser. No. 171,931, Dec. 22, 1993, abandoned.

[30] Foreign Application Priority Data

Dec. 24, 1992 [JP] Japan ..................................... 4-357331

[51] Int. Cl.$^6$ .................... A23L 1/0532; A23L 1/212; A23L 1/31

[52] U.S. Cl. .............. 426/89; 426/92; 426/102; 426/574; 426/575

[58] Field of Search .............................. 426/89, 92, 102, 426/574, 575, 637

[56] References Cited

U.S. PATENT DOCUMENTS

| | | | |
|---|---|---|---|
| 2,992,925 | 7/1961 | Green et al. | 426/102 X |
| 3,676,158 | 7/1972 | Fischer et al. | 426/92 X |
| 3,754,931 | 8/1973 | Waitman et al. | 426/102 |
| 4,427,704 | 1/1984 | Cheney et al. | 426/104 |
| 4,504,502 | 3/1985 | Earle et al. | 426/575 X |
| 4,582,714 | 4/1986 | Ford et al. | 426/564 |
| 4,746,528 | 5/1988 | Prest et al. | 426/573 |
| 4,880,654 | 11/1989 | Okada | 426/574 |
| 4,894,250 | 1/1990 | Musson et al. | 426/573 |
| 5,173,321 | 12/1992 | Hosogoe et al. | 426/573 |

FOREIGN PATENT DOCUMENTS

| | | | |
|---|---|---|---|
| 973427 | 8/1975 | Canada | 426/102 |
| 2639193 | 5/1990 | France . | |
| 3242205 | 5/1984 | Germany . | |
| 3602062 | 8/1987 | Germany | 426/102 |
| WO88/01836 | 3/1988 | WIPO . | |
| WO92/03935 | 3/1992 | WIPO . | |

OTHER PUBLICATIONS

Food Processing, vol. 35, No. 1, Chicago, Ill., p. 30, "Moist extrusions taking shape", Jan. 1974.

Patent Abstracts of Japan vol. 011 No. 141 (C–421), 8 May 1987 & JP-A-61 280243 (Nisshin D C EE Shokuhin KK) Dec. 10, 1986.

*Primary Examiner*—Arthur L. Corbin
*Attorney, Agent, or Firm*—Jordan and Hamburg

[57] ABSTRACT

A fried food, consisting essentially of one or more solid foodstuffs and a paste-like foodstuff. The paste-like foodstuff includes a cohesive foodstuff and a condiment. The cohesive foodstuff includes one or more selected from the group of alginic acid, an alginate and glucomannan. The paste-like foodstuff coats the solid foodstuffs. The coated foodstuff is subsequently frozen or dried and then fried to produce the fried food.

20 Claims, No Drawings

COATED FRIED FOOD PRODUCT

This application is a continuation, of application Ser. No. 08/171,931 filed Dec. 22, 1993, now abandoned.

BACKGROUND OF THE INVENTION

The present invention relates to a technique of frying different foodstuffs, such as potatoes, cheese, mayonnaise and shrimps.

Conventionally, wheat flour is used in cohering a solid foodstuff. This is because gluten, protein of wheat flour coheres the solid foodstuff. However, the cohesive force of gluten is very low. Thus, the coherence of the solid foodstuff using wheat flour provides a condition in which the solid foodstuff is mixed with a dough of wheat flour, so that the taste of any fry combined with at least two kinds of foods cannot be freed of the taste of wheat flour.

Certain proteins are listed as a cohesive substance other than wheat flour. However, they are poor in adhesion with the solid foodstuff, freezing resistance and heat resistance and do not provide a good taste when fried.

SUMMARY OF THE INVENTION

The present invention coheres different foodstuffs in order to provide a fried food. In frying a non-cohesive foodstuff, a large volume of a cohesive agent or foodstuff such as wheat flour must be used in order to prevent the foodstuffs from separating.

The inventors have discovered that a utilization of an unnoticeable, small volume of alginic acid, an alginate or glucomannan has a strong cohesive force in a particular manner of use. Therefore, the present invention can provide a fried food free from the taste of a cohesive component of the fried food combined with at least two kinds of foods and a process for producing same, although the fried food includes a cohesive foodstuff.

The present invention was made on a discovery that since alginic acid, an alginate and glucomannan have high cohesive forces, heat resistance and freezing resistance they are suitable for cohering foodstuffs to be fried, and that the high cohesive forces of them do not exhibit immediately after shaping the foodstuffs to be fried but after a step of freezing or drying them.

An object of the invention is to provide a fried food combining at least two kinds of foods, free from the taste of a cohesive foodstuff in fried foodstuffs.

In order to achieve this object, a first aspect of the present invention is a fried food consisting essentially of at least two solid foodstuffs cohered to each other with a paste-like foodstuff including a special cohesive foodstuff, at least one solid foodstuff combined with the paste-like foodstuff including a special cohesive foodstuff and a non-cohesive popular foodstuff. And the cohesive foodstuff of our invention includes at least one selected from the group of an alginic acid, an alginate and a glucomannan (i.e. natural polysaccharides), and at least 80 wt % water.

A second aspect of the present invention comprises the steps of swelling at least one selected from the group of alginic acid, an alginate and glucomannan to produce as swollen cohesive foodstuff, subsequent to producing a paste-like foodstuff mixed with the cohesive foodstuff and a non-cohesive popular foodstuff, cohering at least one solid foodstuff using the paste-like cohesive foodstuff to produce a cohering foodstuff, freezing or drying the cohering foodstuff, frying the frozen or dried foodstuff to produce a fry, and controlling water content of the fry to at least 80 wt %.

The present invention provides different fries having special tastes which were not experienced and comprising solid, liquid, powdered and/or paste-like foodstuffs at desired composition ratios without providing the taste of the cohesive foodstuff. These foodstuffs to be fried do not contaminate a frying oil. On the other hand, the foodstuffs to be fried are frozen or dried in the form suitable for storage and transportation and allow for mass production.

Herein, the term fried food comprises a fry deeply fried at a temperature of 120°–200° C. (i.e., a conventional frying temperature) and a foodstuff to be fried corresponding to the fry. The fry is obtained by placing foodstuff to be fried in a heated frying oil, replacing the water content in the foodstuff to be fried with the frying oil to reduce the water content to 5 to 80 wt %, preferably, 5 to 60 wt %. The produced fry can be frozen and stored for a long period.

The cohesive natural polysaccharides used in the present invention must have a heat resistance to endure the frying temperature of 120°–200° C. These polysaccharides are listed below.

1) alginic acids: Polysaccharides present in brown algae and comprising D-mannuronic acid and L-guluronic acid. The polysaccharides are obtained by acid processing crude brown algae and subsequently extracting and filtering them from the processed algae. They react on a bivalent ion such as calcium ion to produce thermally irreversible gel.

2) alginate: Metal salts of alginic acids. Conventionally, univalent metal salts of alginic acids, in particular sodium alginate, are used.

3) glucomannan: A polysaccharide present in a tuberous root of devil's tongue (or konjac) and consisting mainly of glucose and mannose. It reacts on alkali to produce thermally irreversibly gel, which is marketed as a Konjac.

These polysaccharides are swollen with water into tenacious pastes. A process is preferably used which comprises the steps of mixing different foodstuffs with one of the pastes into a paste-like foodstuff to season a final fry and cohering or coating the solid foodstuff with the paste-like foodstuff. An addition of different auxiliary agents to the polysaccharides can improve cohesive force and handleability of fries or cooked food products.

The auxiliary agents comprise milk proteins such as casein and gelatin, white of egg such as albumin, wheat protein such as gluten, fish and meat proteins such as myosin and actomyosin, auxiliary cohesive agents of thermally reversible natural polysaccharides such as carrageenan, locust bean gum, guar gum, xanthan gum, pullulan, curdlan, gellan gum, a chitinous substance and chitosan, and processed starch.

Solid foodstuffs to be cohered with the cohesive natural polysaccharides comprise all foodstuffs suitable for frying, such as vegetables such as potato, carrot, sweet potato and onion, fishes and shellfishes such as cuttlefish, shrimp, saurel and a scallop ligament, meats such as beef, chicken and pork, grains such as corn, and processed agricultural and marine foodstuffs such as ham, sausage, corned beef and boiled fish paste.

The cohesive natural polysaccharides swollen into pastes may directly be used. Alternatively, these polysaccharides may be mixed with condiments, flavors to provide a preparation congenial to the solid foodstuff, or indirectly season the solid foodstuff. They can cohere at least two different solid foodstuffs.

The condiments comprise cheese, butter, margarine, mayonnaise, catchup, dressings, soybean sauce (i.e. shoyu), soybean paste (i.e. miso), broth, sauce, curry powder and Japanese horseradish (i.e. wasabi). These condiments are mixed with the cohesive natural polysaccharides swollen to produce paste-like cohesive condiments of desired viscosities. It is preferable that the paste-like cohesive condiments cohere the solid foodstuff.

On the other hand, the solid foodstuff with a desired size suitable for the fry may be coated with the paste-like condiment. The paste-like condiment, which has been fried, causes cohesive natural polysaccharides present therein to be mixed in the fry and does not have the form of paste. In addition, since the cohesive foodstuffs of the present invention have large cohesive forces, they do not contaminate the frying oil. Therefore, the present invention enables foodstuffs such as cheese and mayonnaise to be fried without a contamination of the frying oil although cheese and mayonnaise have not been directly fried because of the contamination of frying oil. The degree of contamination from these foodstuffs according to the present invention is 1/20 or less of that according to a prior art.

Since the cohesive natural polysaccharides used with the present invention have large cohesive forces, only 0.1–20 wt %, preferably, 0.5–15 wt %, more preferably, 1–10 wt % cohesive natural polysaccharides must be added to the solid foodstuff. When a fried foodstuff is simply coated with the paste-like cohesive foodstuff, a volume of the paste-like cohesive foodstuff used can be reduced. On the other hand, when the paste-like cohesive foodstuff is used to cohere fine solid foodstuffs which are then molded, the volume of the paste-like cohesive foodstuff used is slightly increased. In both cases, the paste-like cohesive foodstuff allows the foodstuff to be fried to fully exhibit the taste thereof.

The cohesive natural polysaccharides in the inventive fried foods insufficiently exhibit the cohesive forces and will segregate in the frying oil when the foodstuffs for fry are shaped by pressing or when they are coated with cohesive natural polysaccharides. However, once the foodstuffs for fry are frozen or dried, they exhibit sufficient cohesive forces. The foodstuffs for fry which have been frozen or dried can be saved for a long time, at least six months, so that they maintain good quality and can be directly fried.

A control of the water content in the fried food depends upon the composition of the fried food, a frying temperature and a frying time. There are cases where the fried foodstuffs are fried at an elevated temperature for a reduced period of time and at a reduced temperature for an increased time. Which case is selected depends upon materials and uses of the fried foodstuffs.

For example, a foodstuff for fast-food hamburger is fried at an elevated temperature for a reduced period of time and a water content of this foodstuff is 30–50 wt %. On the other hand, a foodstuff, such as a snack, having a reduced water content is fried at a long period of time and a water content of this foodstuff is 5–20 wt %.

A process for producing a fried food is as follows. First, the cohesive natural polysaccharides are swollen with water to produce cohesive foodstuff. If necessary an auxiliary cohesive agent and different foodstuffs are mixed with the cohesive natural polysaccharides for preparing auxiliary cohesive foodstuffs. These foodstuffs can be mixed with a liquid or pasty seasoning. Subsequent mixing with cohesive natural polysaccharides is used to cohere or coat other different foodstuffs. Preferably, the cohered or coated solid foodstuff is frozen and paved. Then, the frozen solid foodstuff is fried. Instead of the freezing and saving step, the process for producing the fried food may comprise the step of drying the cohered or coated solid foodstuff using warm air, hot air, microwave, far infrared radiation, sunshine, wind or the like. Since, in the present invention, the volume of the cohesive natural polysaccharide used is sufficiently reduced, presence of polysaccharide almost does not affect the taste of the fry. Thus, the cohesive natural polysaccharide may be mixed with an optional foodstuff. In addition, since the cohesive natural polysaccharides of the present invention are in the form of paste, other foodstuffs in the form of paste or powder may be mixed with the cohesive natural polysaccharides. Thus, the cohesive natural polysaccharides can optionally be seasoned with different foodstuffs (especially the solid foodstuffs).

In summary, the present invention provides a technique comprising the steps of selecting as the cohesive foodstuff the cohesive natural polysaccharides enduring a frying temperature and a freezing temperature and firmly cohering solid foodstuffs using the paste-like cohesive foodstuff, and converting the resulting fried foods into a long-term durable form. In a use of the fried foods, it requires no processing and does not contaminate a frying oil. The present invention provides a process for producing the fried food comprising the steps of blending a noncohesive foodstuff, such as cheese, mayonnaise or catchup with the cohesive natural polysaccharides to produce a paste and firmly cohering the solid foodstuff to enable a person to enjoy a mixed taste of the solid foodstuff and the fluid foodstuff.

DETAILED DESCRIPTION OF THE PREFERRED EMBODIMENTS

Examples of the present invention will be described hereinafter. Herein, amounts in the description of the examples of the present invention are expressed in parts per weight.

EXAMPLE 1

1) 25 parts of water were added to 250 parts of cheddar cheese produced in Australia. This mixture is melted at a temperature of 45°–50° C. 7.5 parts of a phosphate, 5 parts of sodium chloride and 50 parts of water were added as emulsifiers to the molten mixture to sufficiently emulsify it. Subsequently, the emulsified mixture was heat pasteurized.

2) 50 parts of water were added to 0.5 parts of curdlan, 0.2 parts of gellan gum and 0.25 parts of processed starch. This mixture was heated and unified. 120 parts of a 4% solution of sodium alginate were added to the heated and unified mixture to produce a paste-like cohesive foodstuff. Subsequently, the heat pasteurized mixture of the step 1) was added to the paste-like cohesive foodstuff to produce a paste-like cohesive foodstuff A.

3) Potato which had been partially fried and subsequently cooled in a process of producing fried potato was coated with the paste-like cohesive foodstuff A of about 10 wt % to the amount of the potato. The potato coated with the paste-like cohesive foodstuff A was frozen in a freezer at −25° C. for a week.

4) When taken out of a freezer, the frozen potato had been uniformly coated with the paste-like cohesive foodstuff A. Subsequently, the potato was placed into a fryer and fried at 180° C. for 3 min in a frying oil. The paste-like cohesive foodstuff A maintained adhesion to the potato. In addition, since the paste-like cohesive foodstuff A cohered well no part of the paste-like cohesive foodstuff A transferred to the frying oil during the frying step and the paste-like cohesive foodstuff A kept the frying oil clean.

5) Cheese in the paste-like cohesive foodstuff A was directly fried to improve the taste of it and well harmonized with the intrinsic taste of the potato, so that a tasty potato product which would not have existed was obtained.

EXAMPLE 2

1) At a step of producing potato shells, 65 parts of the hollow potato shell were filled with 35 parts of the paste-like cohesive foodstuff A. Subsequently, the potato shell being packed with the paste-like cohesive foodstuff A was shaped by pressing to provide a composite potato product and frozen at −25° C. for a week.

2) When the frozen composite potato product was taken out of a freezer, the paste-like cohesive foodstuff A had adhered to the potato shell. Subsequently, this composite potato product was placed into a fryer and fried at 180° C. for 5 minutes in a frying oil. The composite potato product maintained the the original shape. Frying the composite potato product kept the frying oil clean.

3) A direct frying of the composite potato product caused the surface of cheese in the paste-like cohesive foodstuff A to have a light brown color and an aromatic, distinct tactual sense of a fry.

EXAMPLE 3

1) In a process of producing diced potatoes, 65 parts of the paste-like cohesive foodstuff A were mixed with 35 parts of diced potatoes. This mixture was shaped into a disc with an 8-cm diameter and a 1-cm thickness. The disc was frozen in a freezer at −25° C. for a week.

2) When taken out of the freezer, the disc had maintained a uniform texture, and water had not been released. Subsequently, the disc was placed in a fryer and fried in frying oil at 180° C. for 5 minutes. The fried disc maintained the original shape and kept the frying oil clean.

3) Sampling the fried disc provided a good taste.

EXAMPLE 4

The fried disc produced in EXAMPLE 3 was made into a sandwich using a commercially available bread product (i.e. slices of bread for hamburger. The sandwich having some lettuce added to it was sampled. This sandwich made the most of the tastes of potato and cheese and increased advantages of both foodstuffs, unlike a conventional hamburger.

EXAMPLE 5

1) 150 parts of whole egg liquid, 150 parts of vinegar, 20 parts of sodium chloride and 5 parts of a seasoning were uniformly blended.

2) 2 parts of curdlan, 1 part of processed starch, 0.01 parts of calcium hydroxide and 60 parts of water were blended and heated. 35 parts of wheat flour, 25 parts of oligosaccharide, 20 parts of glucomannan, 0.2 parts of xanthan gum and 300 parts of water were fully blended to produce a paste-like cohesive foodstuff B.

3) The blends produced in steps 1) and 2) were mixed. 260 parts of salad oil were added little by little to this mixture while the mixture of the blends produced in steps 1), 2) and salad oil were agitated and emulsified. The emulsified mixture was heat pasteurized and provided a mayonnaise-like foodstuff C.

4) 60 parts of a commercially available potato shell (Munch Skins produced by Lamb-Western Co., U.S.A.) were filled with a blend of 30 parts of the mayonnaise-like foodstuff C and 10 parts of shrimps cut in the form of a block. Subsequently, this composite potato product was shaped by pressing and frozen in a freezer for a week.

5) When the frozen composite potato product was taken out of the freezer, the mayonnaise-like foodstuff C maintained its adherence to the potato shell. Subsequently, the composite potato product was fried in a fryer in a frying oil at 180° C. for 5 minutes. The fried composite potato product maintained the shape and kept the frying oil clean.

6) A composite potato fry of a unique taste was obtained.

The EXAMPLE 5 used salad oil. However, utilizing butter or margarine also provided a tasty composite potato product.

EXAMPLE 6

1) 30 parts of commercially available diced potatoes (Soup Cube produced by Lamb-Western Co., U.S.A.), 10 parts of boiled tuna and 60 parts of the mayonnaise-like foodstuff C in EXAMPLE 5 were mixed and shaped into a disc with an 8-cm diameter and a 1-cm thickness. The disc was coated with a dilute butter suspension and fried in a fryer in a frying oil at 180° C. for 5 minutes. The frying oil was kept clean.

2) The fried disc was frozen in a freezer for a week. When taken out of the freezer, the disc maintained the original texture of the foodstuff C, and did not release the boiled tuna, the diced potatoes or water.

3) The frozen disc was baked in a frying pan. The baked disc maintained the original shape.

4) Sampling the fried and baked disc provided a unique taste of a food product making the most of the unique tastes of mayonnaise, tuna and potato.

EXAMPLE 7

1) 100 parts of tomato puree, 14 parts of vinegar of 6% acidity, 10 parts of sodium chloride, 0.5 parts of a seasoning, 0.3 parts of potassium sorbate and 48 parts of water were mixed and agitated into a liquid blend.

2) 50 parts of the paste-like cohesive foodstuff B produced in EXAMPLE 5 were added to the liquid blend produced in step 1) to produce a mixture. This mixture was heat pasteurized at 80° C. for 20 minutes and produced a catsup-like foodstuff D.

3) 25 parts of the catsup-like foodstuff D were mixed with 15 parts of queen crab flesh. 60 parts of a potato shell were filled with the mixture of the catsup-like foodstuff D and the queen crab flesh to produce a composite potato product. The composite potato product was shaped by pressing and frozen in a freezer for two weeks.

4) After being taken out of the freezer, the frozen composite potato product was fried in a frying oil in a fryer at 180° C. for 5 minutes. Sampling the fried composite potato product provided a taste making the most of the tastes of potato and tomato.

EXAMPLE 8

1) 5 parts of the paste-like foodstuff B produced in EXAMPLE 5 were uniformly blended with 15 parts of a pizza sauce (produced by Heinz Co., U.S.A.). This blend was heat pasteurized at 80° C. for 20 minutes, resulting in a paste-like foodstuff E including the pizza sauce as a major component.

2) 300 parts of a potato shell was filled with a mixture of 20 parts of the paste-like foodstuff E, 40 parts of diced potatoes and 40 parts of the paste-like foodstuff A produced in EXAMPLE 1 to produce a composite potato product. This composite potato product was shaped by pressing and frozen in a freezer for two weeks.

3) The frozen potato product was fried in a frying oil in a fryer at 180° C. for 6 minutes. Sampling the fried potato product provided a taste which made the most of the potato, the cheese and the pizza sauce.

EXAMPLE 9

1) The fried products of step 3) produced in EXAMPLE 6 were sandwiched between freezing-resistant sandwich bread and frozen in a freezer at −25° C. for four weeks.

2) The frozen sandwich was thawed by an electronic cooking range. The thawed sandwich was baked in an oven at 200° C. for 7 minutes. Sampling the baked sandwich provided a sufficient taste for a fast food.

EXAMPLE 10

1) A commercially available scallop ligament was untied and partially dried. 60 parts of partially dried scallop ligament were mixed with the paste-like foodstuff B produced in EXAMPLE 5. This mixture was shaped by pressing it into a square pillar of 5 cm×2 cm×1 cm and subsequently heated and dried by microwaves in an electronic cooking range for 50 minutes.

2) The dried square pillar was fried in a frying oil in a fryer at a temperature of 150°–160° C. for 8 minutes, so that the water content was 20% or less.

3) Sampling this fry provided a distinct tactual taste making the most of the taste of scallop ligament. The fry was found to go well with beer.

EXAMPLE 11

1) 40 parts of the mayonnaise-like foodstuff C produced in EXAMPLE 5 were mixed with 60 parts of corned beef. This mixture was shaped by pressing it into a square pillar of 10.5 cm×11.5 cm×0.5 cm and subsequently frozen at −25° C. for a week.

2) The frozen pillar was directly fried in a frying oil in a fryer at a temperature of 160°–170° C. for 5 minutes so that the water content was 50% or less.

3) The fried pillar was sandwiched between two commercially available slices of bread used for sandwich. The sandwich was divided in fourths.

4) Sampling the sandwich provided a good taste in which tastes of bread, mayonnaise and corned beef were harmonized with one another.

The present invention is not rigidly restricted to the EXAMPLES described above. It is to be understood that a person skilled in the art can easily change and modify the present invention without departing from the scope of the invention defined in the appended claims.

What is claimed is:

1. A fried food consisting essentially of at least one foodstuff and a coating on an exposed surface of said at least one foodstuff, said coating consisting essentially of a mixture of at least one condiment selected from the group consisting of salad oil, vinegar, butter, margarine, mayonnaise, catchup, cheese, soybean sauce, soybean paste, sauces, curry powder and horseradish and at least one cohesive agent selected from the group consisting of alginic acid, an alginate and glucomannan, said fried food being produced by coating said foodstuff with said coating of said condiment and said cohesive agent to obtain a coated foodstuff, freezing said coated foodstuff and then frying said coated foodstuff.

2. The fried food according to claim 1, wherein the amount of said cohesive agent is 0.1–20 wt. %.

3. The fried food according to claim 2, wherein said amount of said cohesive agent is 1–10 wt. %.

4. The fried food according to claim 1, wherein said cohesive agent is glucomannan.

5. A fried food consisting essentially of at least one foodstuff and a coating on an exposed surface of said at least one foodstuff, said coating consisting essentially of a mixture of at least one condiment selected from the group consisting of salad oil, vinegar, butter, margarine, mayonnaise, catchup, cheese, soybean sauce, soybean paste, sauces, curry powder and horseradish, at least one cohesive agent selected from the group consisting of alginic acid, an alginate and glucomannan, and at least one auxiliary agent, said fried food being produced by coating said foodstuff with said coating of said condiment and said cohesive agent to obtain a coated foodstuff, freezing said coated foodstuff and then frying said coated foodstuff.

6. The fried food according to claim 5, wherein the amount of said cohesive agent is 0.1–20 wt. %.

7. The fried food according to claim 6, wherein said amount of said cohesive agent is 1–10 wt. %.

8. The fried food according to claim 5, wherein said auxiliary agent is selected from the group consisting of casein, gelatin, albumin, wheat gluten, myosin, actomyosin, carrageenan, locust bean gum, guar gum, xanthan gum, pullulan, curdlan, gellan gum, chitosan and processed starch.

9. A fried food consisting essentially of at least one foodstuff and a coating on an exposed surface of said at least one foodstuff, said coating consisting essentially of a mixture of at least one condiment selected from the group consisting of salad oil, vinegar, butter, margarine, mayonnaise, catchup, cheese, soybean sauce, soybean paste, sauces, curry powder and horseradish and at least one cohesive agent selected from the group consisting of alginic acid, an alginate and glucomannan, said fried food being produced by coating said foodstuff with said coating of said condiment and said cohesive agent to obtain a coated foodstuff, drying said foodstuff and then frying said coated foodstuff.

10. The fried food according to claim 9, wherein the amount of said cohesive agent is 0.1–20 wt. %.

11. A fried food consisting essentially of at least one foodstuff and a coating on an exposed surface of said at least one foodstuff, said coating consisting essentially of a mixture of cheese and, as a cohesive agent, alginic acid, said fried food being produced by coating said foodstuff with said coating to obtain a coated foodstuff, performing at least one of drying and freezing said coated foodstuff, and then frying said coated foodstuff.

12. A fried food consisting essentially of at least one foodstuff and a coating on an exposed surface of said at least one foodstuff, said coating consisting essentially of a mixture of cheese and, as a cohesive agent, an alginate, said fried food being produced by coating said foodstuff with said coating to obtain a coated foodstuff, performing at least one of drying and freezing said coated foodstuff, and then frying said coated foodstuff.

13. A fried food consisting essentially of at least one foodstuff and a coating on an exposed surface of said at least one foodstuff, said coating consisting essentially of a mixture of cheese and, as a cohesive agent, glucomannan, said fried food being produced by coating said foodstuff with said coating to obtain a coated foodstuff, performing at least one of drying and freezing said coated foodstuff, and then frying said coated foodstuff.

14. A fried food consisting essentially of at least one foodstuff and a coating on an exposed surface of said at least one foodstuff, said coating consisting essentially of a mixture of mayonnaise and, as a cohesive agent, alginic acid, said fried food being produced by coating said foodstuff with said coating to obtain a coated foodstuff, performing at least one of drying and freezing said coated foodstuff, and then frying said coated foodstuff.

15. A fried food consisting essentially of at least one foodstuff and a coating on an exposed surface of said at least one foodstuff, said coating consisting essentially of a mixture of mayonnaise and, as a cohesive agent, an alginate, said fried food being produced by coating said foodstuff with said coating to obtain a coated foodstuff, performing at least one of drying and freezing said coated foodstuff, and then frying said coated foodstuff.

16. A fried food consisting essentially of at least one foodstuff and a coating on an exposed surface of said at least one foodstuff, said coating consisting essentially of a mixture of mayonnaise and, as a cohesive agent, glucomannan, said fried food being produced by coating said foodstuff with said coating to obtain a coated foodstuff, performing at least one of drying and freezing said coated foodstuff, and then frying said coated foodstuff.

17. A fried food consisting essentially of at least one foodstuff and a coating on an exposed surface of said at least one foodstuff, said coating consisting essentially of a mixture of catchup and, as a cohesive agent, alginic acid, said fried food being produced by coating said foodstuff with said coating to obtain a coated foodstuff, performing at least one of drying and freezing said coated foodstuff, and then frying said coated foodstuff.

18. A fried food consisting essentially of at least one foodstuff and a coating on an exposed surface of said at least one foodstuff, said coating consisting essentially of a mixture of catchup and, as a cohesive agent, an alginate, said fried food being produced by coating said foodstuff with said coating to obtain a coated foodstuff, performing at least one of drying and freezing said coated foodstuff, and then frying said coated foodstuff.

19. A fried food consisting essentially of at least one foodstuff and a coating on an exposed surface of said at least one foodstuff, said coating consisting essentially of a mixture of catchup and, as a cohesive agent, glucomannan, said fried food being produced by coating said foodstuff with said coating to obtain a coated foodstuff, performing at least one of drying and freezing said coated foodstuff, and then frying said coated foodstuff.

20. A fried food consisting essentially of at least one foodstuff and a coating on an exposed surface of said at least one foodstuff, said coating consisting essentially of a mixture of at least one condiment selected from the group consisting of salad oil, vinegar, butter, margarine, mayonnaise, catchup, cheese, soybean sauce, soybean paste, broths, sauces, curry powder and horseradish, at least one cohesive agent selected from the group consisting of alginic acid, an alginate and glucomannan, and at least one auxiliary agent, said fried food being produced by coating said foodstuff with said coating of said condiment and said cohesive agent to obtain a coated foodstuff, drying said foodstuff and then frying said coated foodstuff.

* * * * *